Sept. 3, 1968   G. MESSNER   3,400,055
METHOD AND APPARATUS FOR BREAKING ELECTRIC
CURRENT IN FLUENT CONDUCTORS
Filed May 20, 1966   8 Sheets-Sheet 2

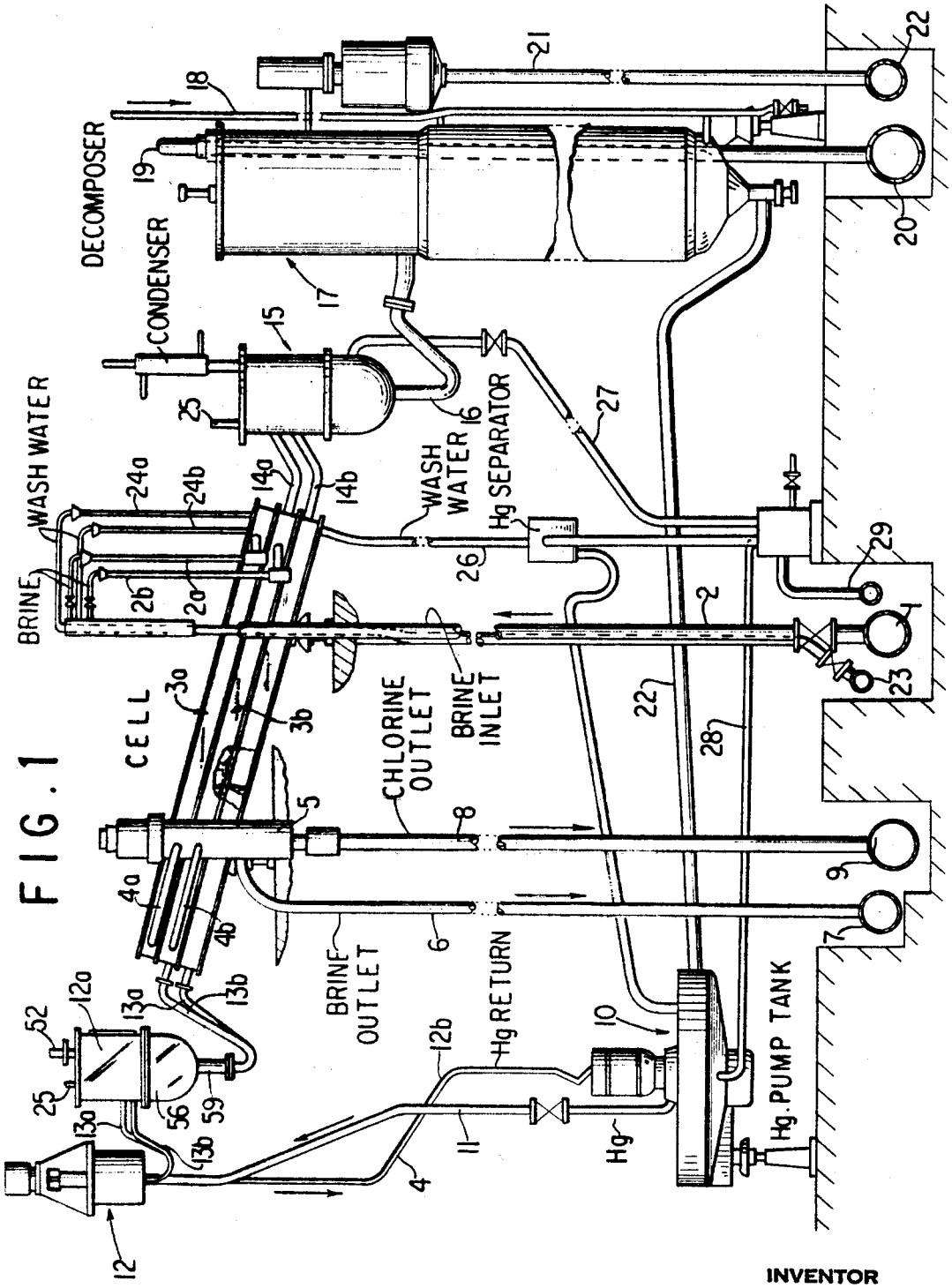

INVENTOR
GEORG MESSNER
ATTORNEYS

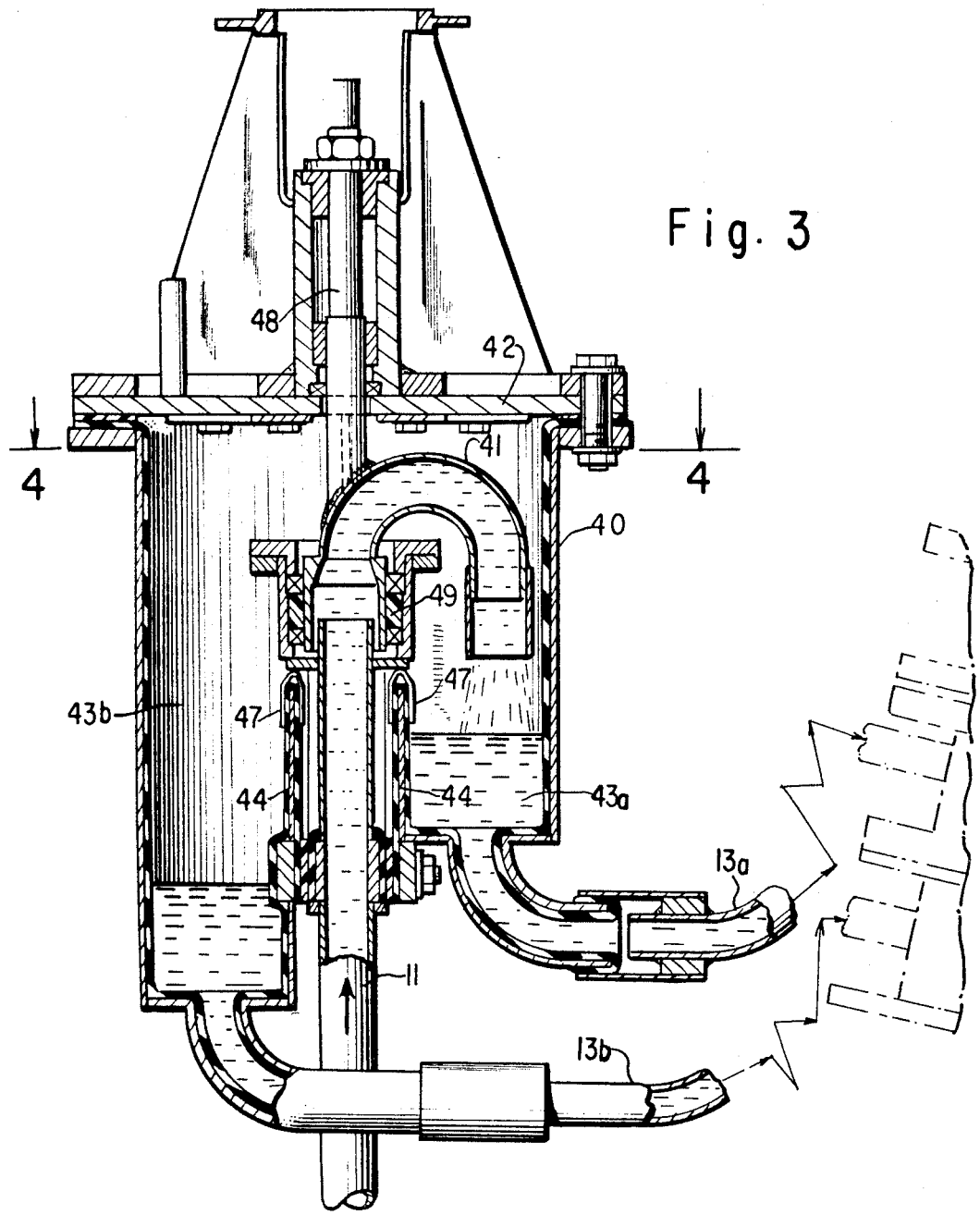

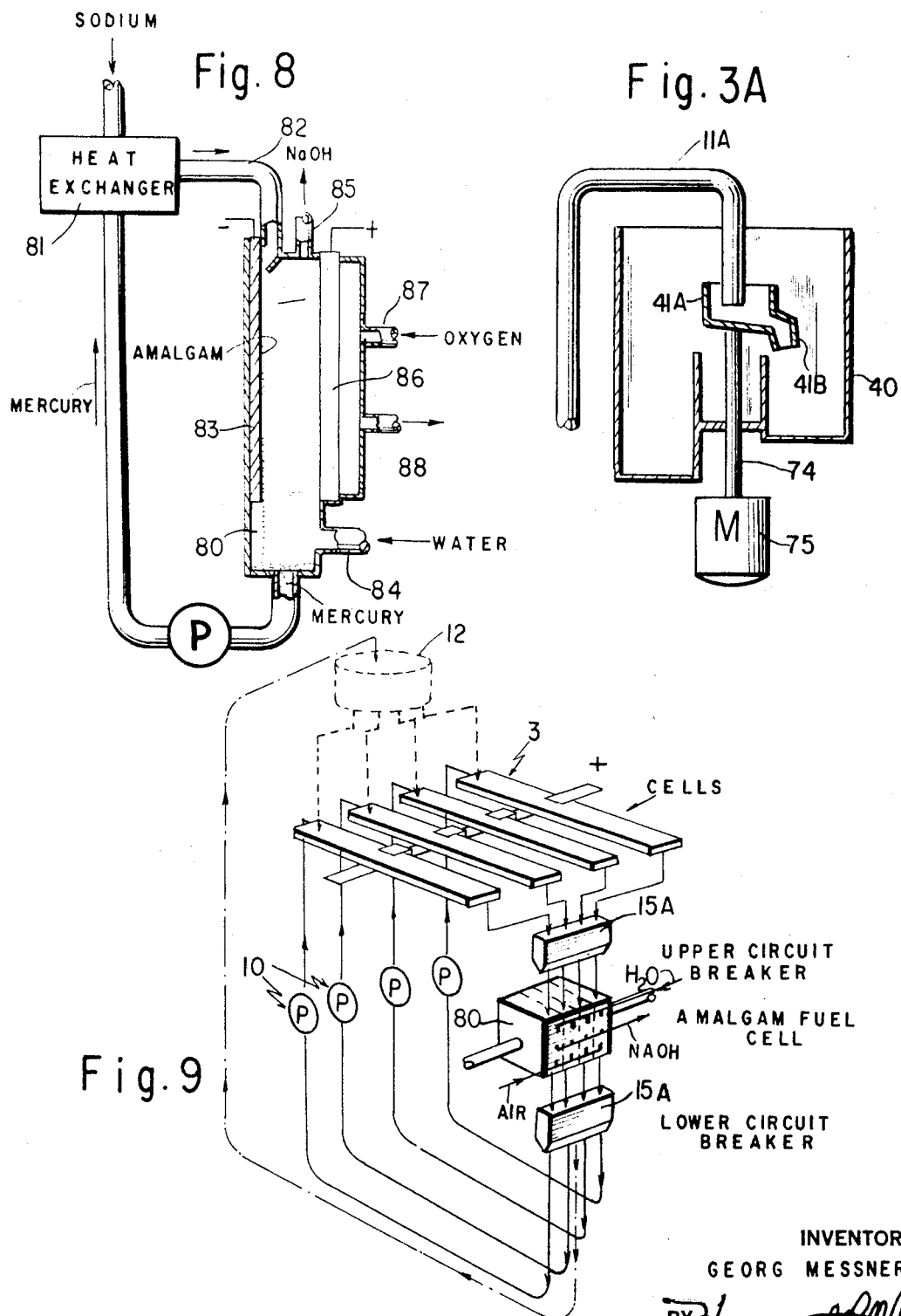

Sept. 3, 1968 G. MESSNER 3,400,055
METHOD AND APPARATUS FOR BREAKING ELECTRIC
CURRENT IN FLUENT CONDUCTORS
Filed May 20, 1966 8 Sheets-Sheet 7

INVENTOR
GEORG MESSNER
BY
ATTORNEY

Sept. 3, 1968 G. MESSNER 3,400,055
METHOD AND APPARATUS FOR BREAKING ELECTRIC
CURRENT IN FLUENT CONDUCTORS
Filed May 20, 1966 8 Sheets-Sheet

INVENTOR
GEORG MESSNER
BY
ATTORNEY

United States Patent Office 3,400,055
Patented Sept. 3, 1968

3,400,055
METHOD AND APPARATUS FOR BREAKING ELECTRIC CURRENT IN FLUENT CONDUCTORS
Georg Messner, Milan, Italy, assignor to Oronzio de Nora Impianti Elettrochimici, Milan, Italy, a corporation of Italy
Continuation-in-part of application Ser. No. 227,907, Oct. 2, 1962. This application May 20, 1966, Ser. No. 551,734
10 Claims. (Cl. 204—1)

ABSTRACT OF THE DISCLOSURE

Describes a method of feeding mercury into and discharging amalgam from a multiple tier bi-polar electrolysis cell in which each tier operates at a different potential and in which the mercury feed and amalgam discharge streams are divided into electrically separated increments to prevent short circuits between the separate tiers and the feed streams.

---

This application is a continuation-in-part of application Ser. No. 227,907 filed Oct. 2, 1962, now abandoned.

This invention relates to a method and apparatus for breaking an electric current carried by a fluent conductor. The invention more particularly relates to apparatus used with multiple tier horizontal type electrolytic cells or fuel cells having a flowing mercury cathode to break the current to and from the mercury cathode, to thereby insulate the mercury in each tier from the adjacent tiers which operate at a different voltage.

In the horizontal type mercury cell, as described, for example, in United States Patent No. 2,544,138, mercury or mercury amalgam flows over the cell base from end to end of the cell forming a flowing mercury cathode, the electrolyte occupies the space between the anode surfaces and the cathode and electrolysis of the electrolyte takes place in the gap formed between the anode and the cathode surfaces.

In normal use, the base of the cell over which the mercury cathode flows is inclined sufficiently to permit the mercury to flow by gravity. The normal angle of inclination is about 0.20 to 5.0° from the horizontal. The base may be made of a conductive metal, usually steel, or a non-conductive material. If the base is a non-conductive surface, the base will have metal inserts to establish electrical contact with the mercury.

It is desirable to construct horizontal mercury cells in tiers, that is, one cell superimposed upon another.

In such an arrangement as disclosed herein, the base for the upper cell also serves as the top for the lower cell, etc. The anodes for the lower cell are attached to the underside of this base. Thus, the superimposed cells are arranged as bi-polar cells wherein the upperside of the dividing base is the cathode contact and the lower side is the anode contact. In such an arrangement, the cell voltage drop for the different cells are the same, but the potential above ground for each cell is different. In operating a number of bi-polar cells, there is a possibility of "shorts" formed by (1) the feed brine streams entering the bi-polar elements, (2) the depleted brine streams leaving the bi-polar elements, (3) the mercury streams entering the bi-polar elements and (4) the amalgam streams leaving the bi-polar elements. These "shorts" between the bi-polar elements operating at different voltages result in current leakages, i.e., energy losses. The amount of current leakage is not a serious problem in the case of the brine streams, because of the electrical resistance of the brine in the long conduits. However, the conductivity of the mercury and amalgam streams is so high that it poses serious problems such as high current losses, and mechanical damage to cells. The shorts between the mercury streams at different voltages cause arcing and vaporization of the mercury, and thus loss of the mercury. For these reasons, it is necessary to take special steps to handle the mercury and amalgam streams fed to the different tiers of a multiple tier bi-polar cell so as to prevent the above occurrences.

The same problems arise in the use of cells used for the direct conversion of chemical energy into electrical energy, known as fuel cells, in which fluent mercury is used in the form of a sodium amalgam and flows through the cells. One type of cell was described in an article, "Fuel Cells—State of the Art, 1961," by John I. Slaughter, in transactions of the Electrochemical Society, Indianapolis, Ind., May 1, 1961. If several such cells are connected as bi-polar cells, it is necessary to keep the amalgam in each cell electrically separated from that in each other cell and any other electrical charge.

It is therefore an object of this invention to provide a method and apparatus for breaking the electrical current in a fluent electrical conductor at the inlet and outlet points of an electrolytic cell.

It is a further object of this invention to provide a method and apparatus for feeding mercury to and withdrawing amalgam from a plurality of mercury electrolytic cells operating at different voltages whereby short circuits are prevented between the cells operated as bi-polar cells at different voltages.

Another object is to provide a method and apparatus for feeding and withdrawing mercury and mercury amalgam to and from a plurality of bi-polar electrolytic cells whereby energy losses and mercury losses are prevented.

Another object of this invention is to provide a means and apparatus to break the electric current in a stream of mercury being fed as a cathode to a plurality of bi-polar electrolytic cells and for further breaking the current in the amalgam streams withdrawn from these cells.

A further object is to provide a method and apparatus for electrically separating in each cell a stream of mercury amalgam passing through a plurality of electrolytic cells having a different potential in each cell.

These and other objects of my invention will become apparent as the description thereof proceeds.

These objects may be attained by the use of my invention which comprises briefly the use of a special mercury distributor or proportionator at the inlet side of the bi-polar electrolytic cells which operate at different voltages to separate the feed stream into separate streams of approximately equal size going to each individual cell, and the use of separate circuit breakers whereby the feed stream to each of the separate cells is broken into a number of electrically separate increments. The separate streams to the different cells of a multiple tier cell, for example, have no electrical contact with each other, but each has contact individually with its feed stream as it momentarily supplies mercury to the individual cells. Thus the mercury distributor has an electric current breaker between the different cells at the inlet thereof.

At the discharge end of the cells, the separate amalgam streams from the cells are fed into a similar current breaker and then may be recombined into a single stream going to an amalgam decomposer or may be fed as separate streams to separate decomposers. The amalgam streams are passed through a circuit breaking device which separates each stream into a number of electrically separate increments before entering the common stream or before going to separate decomposers, thus also serving as an electric current breaker between the different cells at the outlet end thereof.

The invention will be more fully understood by reference to the drawings in which, FIG. 1 shows one embodiment of a substantially complete multiple tier bi-polar mercury electrolytic cell installation in elevation, showing the electrolytic cells, amalgam decomposer, mercury distributor, inlet and outlet circuit breakers, mercury pump, conduits, etc.

FIG. 3 shows a cross-sectional view in elevation of a proportionating mercury feeder.

FIG. 3A shows an alternate construction for a proportionating mercury feeder.

FIG. 8 shows a simplified cross-sectional view in elevation of an amalgam fuel cell.

FIG. 9 shows a view in perspective of a combined installation including mercury amalgam fuel cells, mercury electrolysis cells, inlet and outlet circuit breakers, mercury pump and conduits.

Figure 6A:
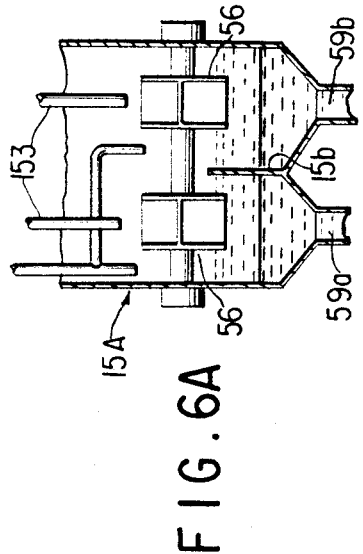
FIG. 6A shows an alternate construction for the mercury feed circuit breaker of FIGS. 5 and 6.

Referring to FIG. 1, the process for the electrolysis of brine comprises briefly feeding brine from the feed brine header 1, through conduits 2, 2a and 2b, into bi-polar cells 3a and 3b. The depleted brine is discharged at outlets 4a and 4b into separator 5. Chlorine is separated in separator 5, and brine flows through conduit 6 to header 7, and back through a resaturation system whereas chlorine is discharged through conduit 8 into header 9. While it is preferred to feed saturated brine into the lower end of the bi-polar cell units 3a and 3b and remove depleted brine from the upper end of the cells, the brine can be fed into either end of the cells.

Mercury is fed to cells 3a and 3b, by means of pump 10 through conduit 11 where it is separated by mercury feed proportionator 12 into separate but equal streams and passes through conduits 13a and 13b to the mercury feed circuit breaker 12a and then through similar conduits 13a and 13b to cells 3a and 3b. Mercury to proportionator 12 which is in excess of the amount required is returned to pump 10 by way of conduit 12b. The function of the proportionator 12 will be described more fully in subsequent paragraphs.

Thus the mercury flows by gravity through the cells whereby the brine is electrolyzed to produce chlorine and the mercury picks up sodium becoming mercury amalgam.

The cells 3a and 3b are preferably inclined about 15° from the horizontal, although any inclination from about 0.16° to 85° may be used. Where the cells are inclined, preferably between 5° and 30°, from the horizontal the increased speed of the mercury flow relative to the electrolyte increases the efficiency of the cell. Only two cells or cell tiers 3a and 3b have been shown, however, any number of bi-polar cells in tiers, one on top of the other may be used. My preferred construction is a five tier cell.

The amalgam is discharged at the lower end of cells 3a and 3b through conduits 14a and 14b into amalgam discharge circuit breaker 15 where the amalgam from the separate cell tiers is separated into individually separate increments which may be fed into separate decomposers or combined into a single stream which passes through conduit 16 to decomposer 17 for the streams from all the cell tiers. In the decomposer, water enters at 18 and is contacted counter currently with the amalgam to produce hydrogen, discharged by conduit 19 to header 20, and sodium hydroxide, discharged through line 21 to header 22, and the mercury substantially freed from sodium is recycled through conduit 22 to pump 10 or separate mercury streams from separate decomposers, one for each cell tier may be recycled to pump 10. In the pump 10 all of the mercury is at ground potential and the individual streams feed into the cell tiers and discharged as amalgam from the cell tiers must be provided with circuit breakers at the inlet and outlet ends of the cell tiers as each tier operates at a different voltage.

Wash water from header 23 for flushing the cells may be passed through conduits 24a and 24b and into the lower end of cell tiers 3a and 3b and through the amalgam discharge circuit breakers by conduits 25, to flush out the cell tiers 3a and 3b, the mercury feed circuit breaker 12a, and the amalgam discharge circuit breaker 15. Discharge wash water is collected through lines 26, 27, 28, etc. into header 29.

The cells tiers 3a and 3b may be of the type generally referred to as horizontal mercury cells, having an inclination of about 0.16° to 0.5° from the horizontal, however, the cell tiers 3a and 3b are illustrated as inclined about 15° from the horizontal. Cells having inclinations of about 2° to about 85° from the horizontal are referred to as inclined plane mercury cells and inclinations of between 5° and 30° are preferred. My invention is applicable to either horizontal or inclined plane multiple tier mercury cells, in which the tiers operate at different voltages above ground.

Figure 2:
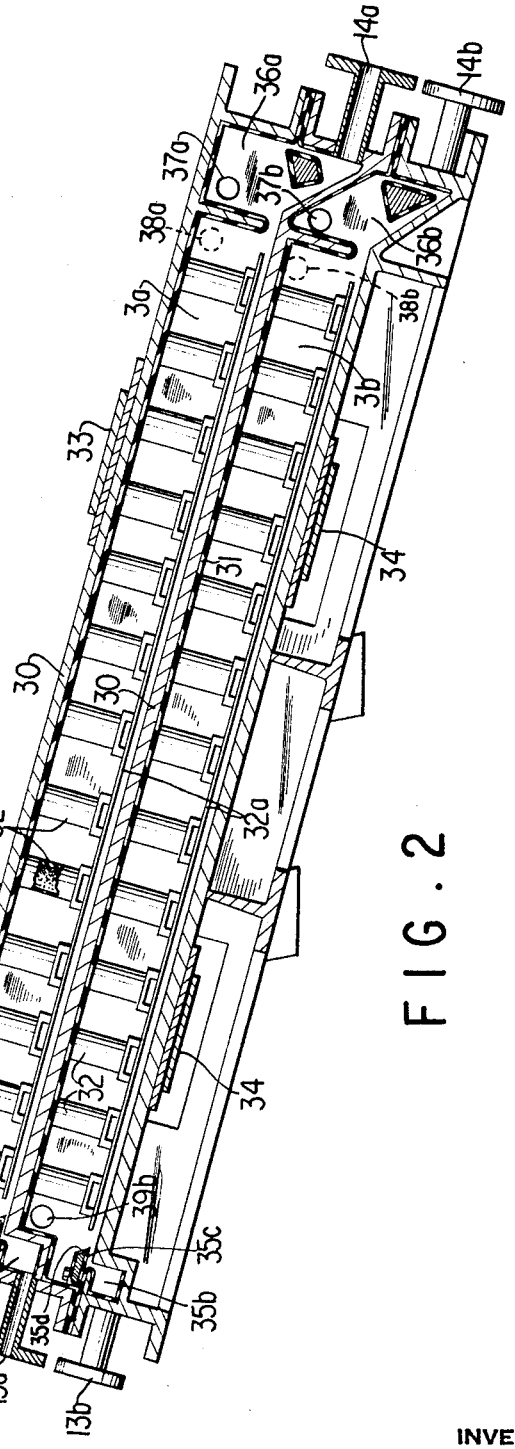
FIG. 2 shows a cross-sectional view in elevation of two superimposed bi-polar mercury electrolytic cells.

These cells are superimposed on one another (see FIG. 2) so that a common partition 30 serves as the base of cell tier 3a and the top of cell tier 3b. While only two tiers have been illustrated, any number of stacked tiers may be used.

Plate 30 is steel, nickel clad on its upper side, to form a base over which the mercury cathode flows in tier 3a. A rubber coating 31 is provided on the lower side of plate 30 to insulate the metal from corrosion. A similar rubber coating is used on all cell surfaces in contact with brine or chlorine. Anodes 32a are suspended from the lower side of the top of each cell tier. Thus these anodes are in direct connection with plate 30 there above. Cells mounted in this way are bi-polar since current passes from positive bus bars 33 through cover 30 and anode connectors 32 to the anode plates 32a, then through the electrolyte in 3a, to the flowing mercury cathode and lower plate 30, thence to anodes 32a in cell 3b and so on to the negative bus bars 34. Thus the cells are connected from the cathode of one cell to the anode of the succeeding cell and so on. Where multiple tiers are used, that is, in two, three or more cell units, the current path is the same. Each cell operates at a different voltage, because of the voltage drop through the preceding cell tier, but only one set of positive and negative bus bar connections are needed for the entire cell stacks. The anode plates 32a are preferably perforated or recticulated titanium provided with a platinum plate on the active surface thereof.

Mercury enters the cells through conduits 13a and 13b into mercury feed boxes 35a and 35b, which extend the entire width of the cells, flows down the inclined bases of tiers 3a and 3b into end boxes 36a and 36b and out conduits 14a and 14b as amalgam. Any hydrogen envolved in the end box is vented through outlets 37a and 37b.

A member 35c is provided at the top of each mercury feed box 35a, 35b, etc. The members 35c extend substantially over the entire width of the mercury feed boxes and serve to spread mercury flowing out of the feed boxes and under the spreaders in a uniform layer over the base or cathode plate 30 of each cell tier. The spreaders 35c are provided with an insulating layer 35d and are adjustable by means of bolts 35e to adjust the gap through which the mercury flows on to the top of plates 30.

Brine enters the cells through inlets 38a and 38b at the lower end of the cells and leaves through the chlorine and depleted brine outlets 39a and 39b at the upper end of the cell units in the embodiment illustrated. Each cell tier is preferably filled with electrolyte to the level of the chlorine and depleted brine outlets 39a and 39b to provide flooded cells with the space between the chlorine and depleted brine outlets 39a and 39b and the upper edge 3e of each tier serving as a gas release space.

Since the bi-polar cells operate at different electric potentials it is necessary to break or insulate the mercury feed stream to and from each cell unit to prevent short circuiting, and arcing between mercury streams at different potentials. It is also desirable to provide substantially the same amount of mercury feed to each tier so that the tiers will operate with substantial uniformity.

Figure 4:
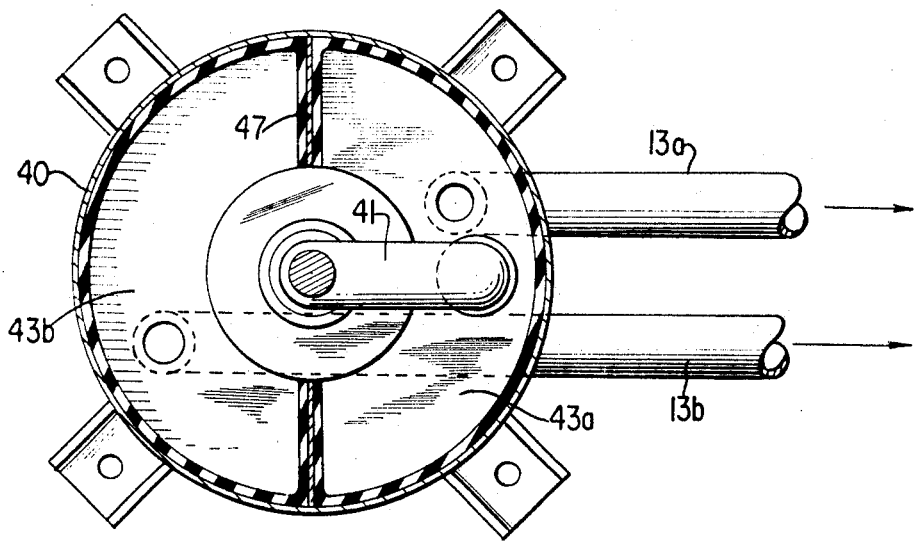
FIG. 4 shows a cross-sectional plan view taken substantially along the lines 4—4 of FIG. 3 of the proportionating mercury feeder.
Figure 5:
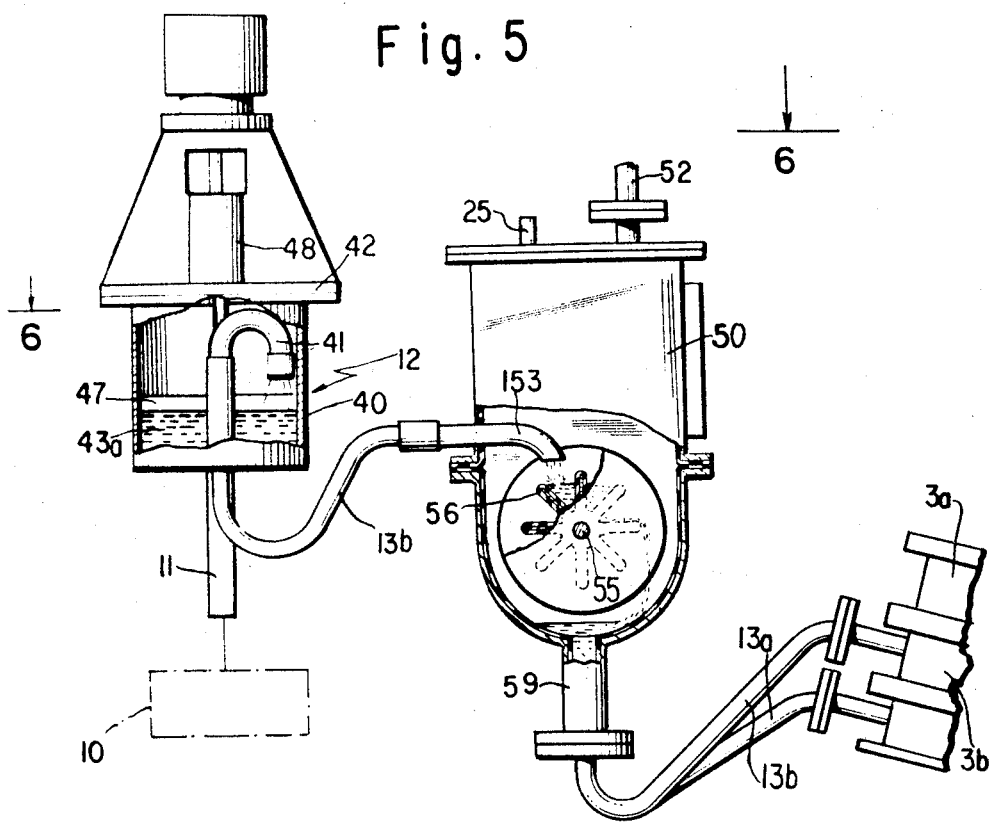
FIG. 5 shows a broken cross-sectional side view of the proportionating mercury feeder and of the mercury feed circuit breaker.
Figure 6:
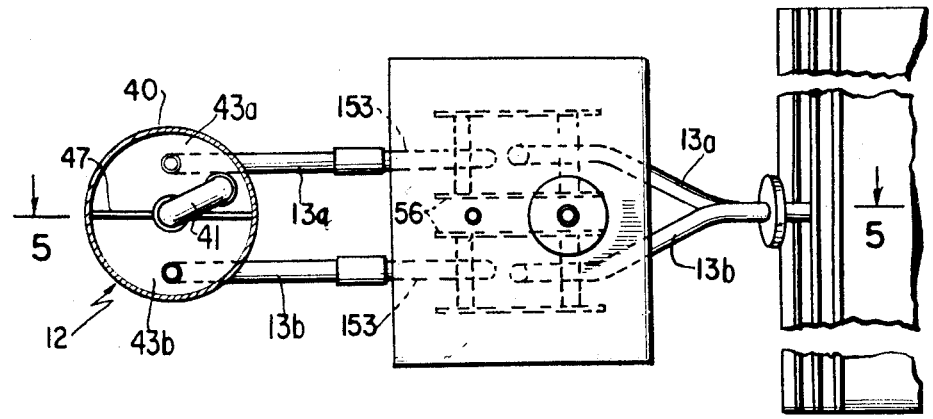
FIG. 6 shows a plan view partly in cross-section taken substantially along the lines 6—6 of FIG. 5.

In the mercury feed circuit, the mercury proportionator 12 comprises a vertically disposed rubber lined cylindrical tank 40 (see FIGS. 4, 5 and 6). Mercury conduit 11 carrying the main stream of mercury from pump 10 passes upward through the tank 40 along the vertical axis thereof and terminates in an inverted tube 41. Tank 40 is closed by top 42. For feeding a two unit bi-polar cell, two separate compartments 43a and 43b are formed in tank 40 by vertical partition 47. Compartments 43a and 43b discharge at the lower end into conduits 13a and 13b. Partition 47 thus forms two separate compartments 43a and 43b. If more than two cell tiers are to be fed, separate compartments of equal size must be provided for each tier. Excess mercury is pumped through line 11 and flows back to pump 10 through conduit 12b. (See FIG. 1.)

A vertical shaft 48 (see FIG. 3), journaled through the top 42 is fastened to tube 41 at its lower end and to a source of rotative power (not shown) at its upper end.

In operation, mercury delivered by pump 10 through conduit 11 passes out of tube 41 as a steady unbroken stream. Tube 41 is connected to conduit 11 by any suitable packed joint 49. Tube 41 is rotated clockwise by shaft 48 so that the mercury stream passes in turn over compartments 43a and 43b, repeatedly.

As the mercury stream passes over compartment 43a, mercury which enters compartment 43a flows by gravity through conduit 13a and through a star wheel circuit breaker 56 and then to cell tier 3a and the mercury which enters compartment 43b flows through conduit 13b and a similar star wheel circuit breaker to cell tier 3b. As the compartments 43a and 43b are of equal size, substantially equal measured amounts of mercury are fed into each cell tier. When more than two tiers are used, a similar number of proportionating compartments of equal size will be used. This assures an equal amount of mercury flowing to and through each of the cell tiers. Thus for a three unit cell tier the tank 40 would be divided into three approximately 120° compartments and for a four unit bi-polar cell tier the tank 40 would be divided into four approximately 90° compartments, etc.

The compartments 43a and 43b are rubber lined on the inside to avoid rust, which if formed, would enter the cell tiers.

Thus by means of mercury feed proportionator 12, the mercury feed stream is divided into substantially equal amounts for each tier and fed through the circuit breaker 56 to the separate cell tiers while preventing electrical contact between the mercury in the different cell tiers.

FIG. 3A illustrates an alternate construction for the proportionating mercury feeder 40. In this embodiment, the construction is generally the same except that the mercury is fed through a stationary U tube 11A which is entirely outside the device. The U tube 41, shown in the proportionator of FIG. 3, is replaced by a receptacle 41A having a discharge tube 41B. A shaft 74 is positioned along the vertical axis and attached at its upper end to receptacle 41A, with a rotative power means 75 at the lower end of the shaft. Thus mercury is fed by U tube 11A to receptacle 41A which is rotated by shaft 74 and motor 75. Thus discharge tube 41B feeds to the compartments in the same manner as the U tube 41 of FIG. 3. The device of FIG. 3A has the advantage that mercury does not have to pass through a conduit having a movable, packed joint.

From the proportionator 12 the mercury for each tier flows through a star wheel or other type of circuit breaker 50 (see FIG. 5) which divides the mercury stream into a number of individually separate increments so that the circuit between each increment is broken and the cell tiers, operating at different voltages, may each be fed with a separate mercury stream and short circuiting back to the proportionating feeder 12 prevented. A separate star wheel circuit breaker is provided for each tier. The star wheels may be mounted on a common horizontal shaft 55 for rotation at a constant speed. From the star wheel feeder 56 the mercury flows thorugh conduits 13a and 13b into the separate cell tiers. As a similar star wheel circuit breaker is used for the amalgam at the discharge end of the cell tiers, the circuit breaker will be described in greater detail with reference to the amalgam discharge.

After the mercury has passed through cell tiers 3a and 3b, and has become amalgam, it is preferably recombined into a common discharge stream for treatment in a single decomposer 17, or the amalgam stream from each tier may be sent to separate decomposers and the separate streams reunited in the pump reservoir from which the mercury is pumped from pump 10 to the proportionating feeder 12.

The amalgam discharge streams must be kept separated electrically from each other to prevent shorts between the mercury streams discharged from the different cell tier units operating at different voltages, and after the circuit breaker all of the streams may be combined and fed to a single decomposer or, if a separate decomposer is used for each stream, the separated streams may be fed at a common potential to the separate decomposers.

Figure 10:
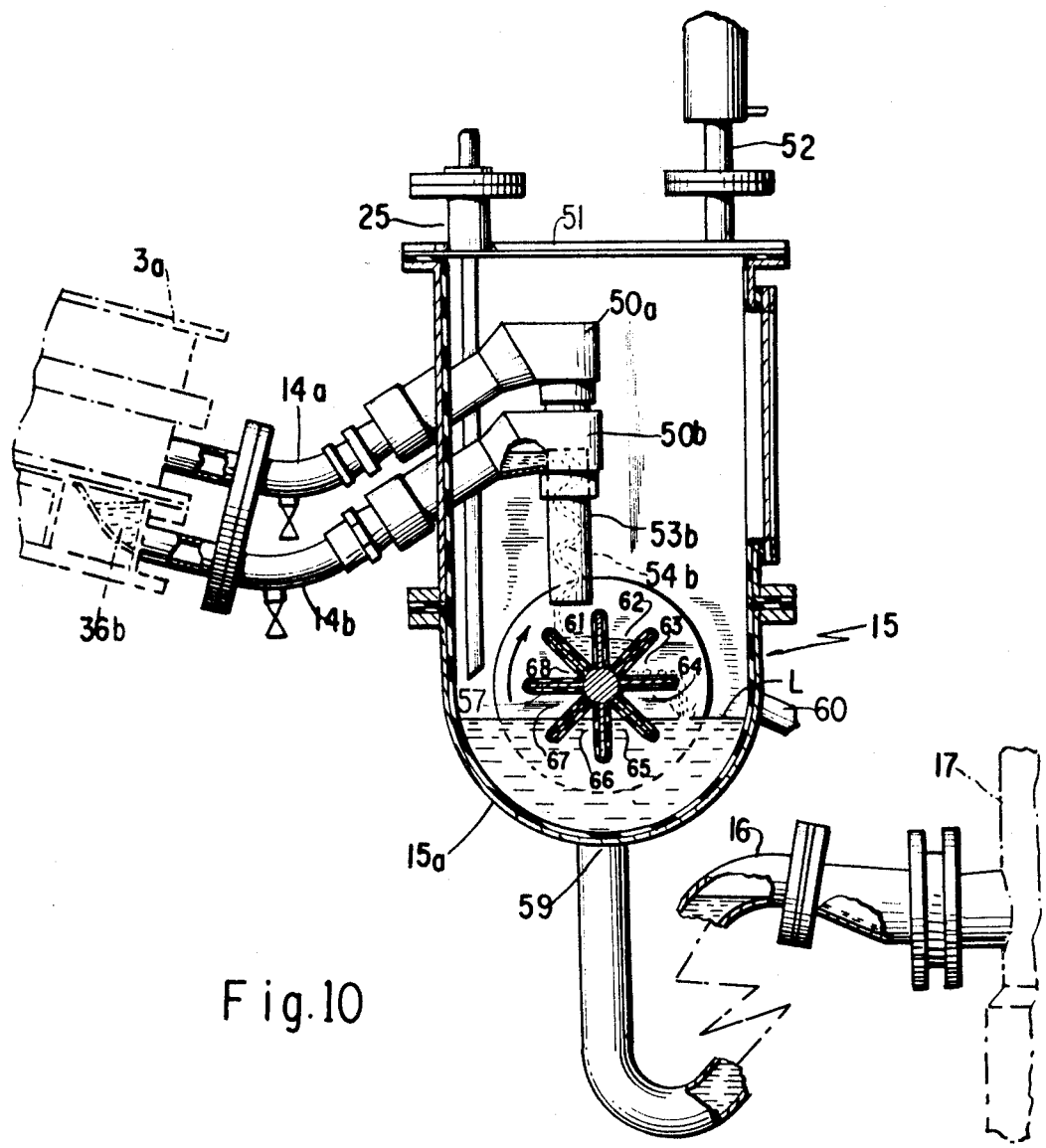
FIG. 10 shows a cross-sectional side view of one embodiment of an amalgam discharge circuit breaker.
Figure 11:
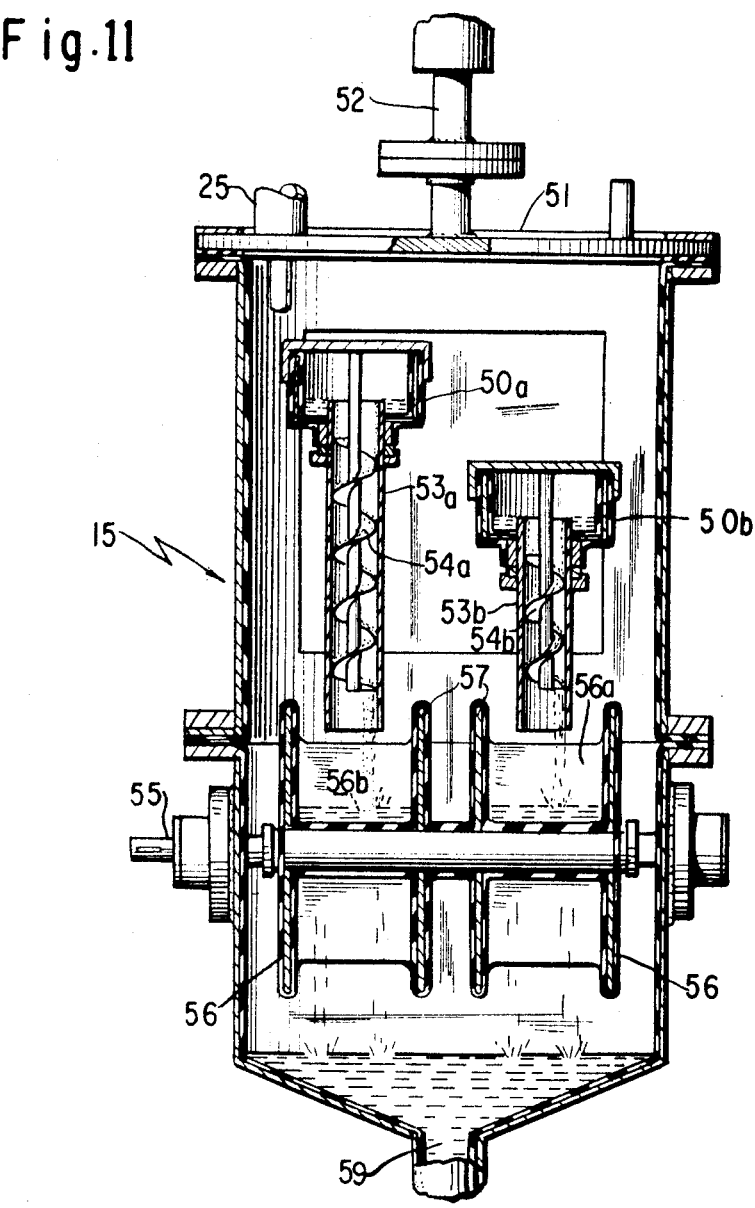
FIG. 11 shows a cross-sectional end view of the amalgam discharge circuit breaker shown in FIG. 10.

In the embodiment of an amalgam circuit breaker illustrated in FIGS. 10 and 11 the amalgam from cell tiers 3a and 3b passes out through discharge conduits 14a and 14b. In FIG. 10 it may be seen that the amalgam collects in a pool in the end box 36b of tier 3b (and similarly in end box 36a in tier 3a), from which it flows into the conduits 14a and 14b which enter the amalgam discharge circuit breaker 15 and connect with enclosed vertical discharge conduits 50a and 50b respectively. These discharge conduits are located inside the circuit breaker tank 15 which is rectangular in transverse cross-section in the same manner as circuit breaker 12a in FIG. 6 and in side cross-section has a curved bottom section 15a. A top 51 closes tank 15, and an inlet 25 is provided for wash water, and an outlet 52 to a mercury condenser. The wash water is fed continuously and kept at the level L, passing out through outlet 60.

Since superimposed cells 3a and 3b are at different heights, and thus also their discharge conduits 14a and 14b, amalgam conduits 50a and 50b are at different elevations within tank 15 and spaced apart laterally. The amalgam conduits have vertical discharge tubes 53a and 53b, which are provided with helical descending flights 54a and 54b. This arrangement provides for steady amalgam discharge in a continuous stream which is not broken into separate droplets.

Tank 15 is fitted with a transverse shaft 55 which may be rotated by power means (not shown) or in any other manner. Shaft 55 carries star wheels 56a and 56b which are positioned on the shaft beneath discharge tubes 53a and 53b respectively (see FIG. 11). Where more than two cell tiers are used a separate star wheel for each tier will be mounted on the shaft 55. The tank 15 and shaft 55 will be elongated to accommodate the required number of star wheels. The surfaces of each star wheel are insulated from each other electrically by rubber insulation 57 and the star wheels are spaced apart along the shaft 55, as illustrated in FIG. 11. Each star wheel has eight compartments which are illustrated as numbers 61 through 68 in FIG. 10. These compartments are also insulated from each other by rubber lining 57. Outlet 59 is provided at the bottom of tank 15 where amalgam flows into conduit 16 and thence to decomposer 17 where one decomposer is used for several cell tiers. Where separate decomposers are used for each cell tier a separating wall 15b (see FIG. 6A) is used between each star wheel to separate the amalgam streams from each star wheel and separate conduits 59a and 59b convey the amalgam streams to separate decomposers.

In operation, amalgam from cell tiers 3a and 3b, flows through conduits 14a and 14b into discharge conduits 50a and 50b. Here, the amalgam overflows the top edge of vertical tubes 53a and 53b and travels down spiral flights 54a and 54b. These spiral flights provide a means for letting the amalgam down to a common level from different heights, without a long vertical free drop which would scatter the amalgam, cause splashing and thus possibly defeat the purpose of keeping the different streams electrically separated. The amalgam streams are discharged from spiral flights 54a and 54b into star wheels 56a and 56b respectively. Rotation of the star wheels discharges the amalgam in each compartment, into the common pool or into separate pools in the bottom of circuit breaker tank 15. Thus these star wheels effect the two desired types of electrical separation.

First, since these star wheels are insulated from one another, amalgam streams are also electrically insulated and therefore so are the bi-polar cell tiers 3a and 3b. Second, the separation of the common amalgam pool discharged through outlet 59 or the outlets 59a and 59b, from the amalgam streams coming from cells 3a and 3b is also effected by the star wheels. Taking star wheel 56b, for example, the amalgam stream from spiral flight (see FIG. 10) is separated by the revolution of the wheel whereby the amalgam is discharged successively into eight electrically separated compartments which pass beneath the amalgam stream during one revolution. It will be seen (FIG. 10) that when the amalgam stream is filling compartment 61; compartment 62, already filled is electrically separated from chamber 61; and compartment 63, insulated from 61 and 62, is discharging amalgam to the common amalgam pool or to separate pools for separate decomposers. Thus, compartment 63 is in electrical contact with the amalgam pool and decomposer 17, but not with the corresponding electrolytic cell tier 3b. Star wheel 56a is simultaneously performing the same function as star wheel 56b for the amalgam discharge from cell tier 3a. Thus, the amalgam stream from cell tier 3a is likewise separated from decomposer 17 or from pump 10 in case separate decomposers are used for each cell tier. It will be seen, therefore, that the amalgam streams from cell tiers 3a and 3b have been electrically separated each from the other, and each stream has also been electrically separated between the cell and the common amalgam decomposer 17 or pump 10. Any number of amalgam streams may be separated in this manner provided that there is a star wheel and a discharge tube and well for each stream. Tank 15 and shaft 55 can be elongated laterally and vertically to the extent necessary to accommodate the number of star wheels corresponding to the number of cell units in the cell stack. The star wheel circuit breakers 56 (FIGS. 5 and 6) for the mercury feed operate in a substantially similar manner.

Figure 7:
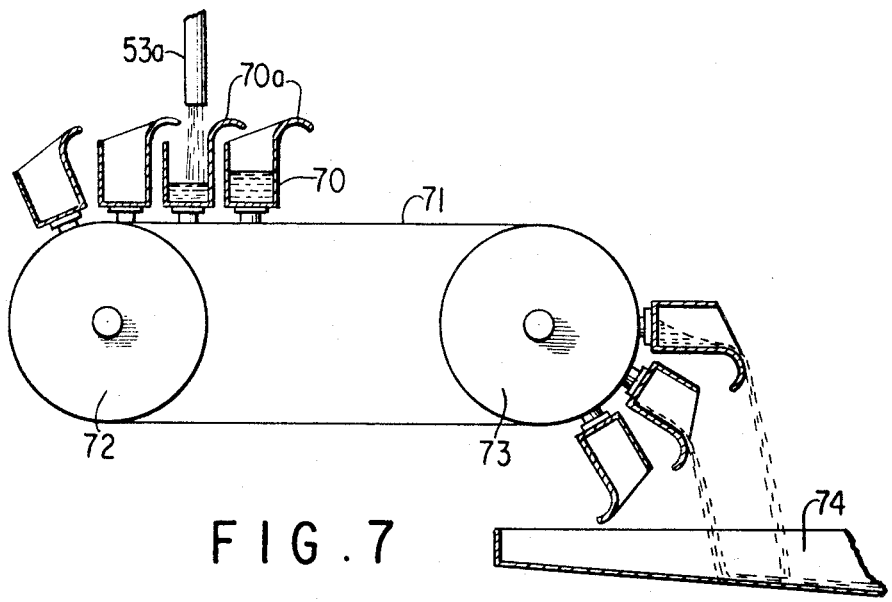
FIG. 7 shows an alternative form of construction for a mercury feed or amalgam discharge circuit breaker.

FIG. 7 shows an alternative construction for the amalgam discharge circuit breaker. In this embodiment, each star wheel 56 is replaced by cups 70 carried on an endless belt 71 passing over pulleys 72 and 73. Cups 70 discharge into a trough 74 which feeds to the common amalgam pool or pump 10. Cups 70 are insulated from each other and the insulated over-lapping lips 70a break the amalgam stream between each cup. Other embodiments of circuit breakers may be used.

Thus, this method and apparatus makes it possible to feed mercury to a plurality of bi-polar electrolytic cells while keeping these cells electrically separated, and to withdraw amalgam from the cells, still keeping them electrically separated, and to combine the amalgam streams into a common discharge pool electrically separated from said streams and therefore the bi-polar cells, all of this being accomplished in a simple yet effective manner.

In the embodiment of circuit breaker for feeding mercury into the cells (see FIGS. 5 and 6), the mercury supply from pump 10 is first passed to a mercury proportionator 12, then to a star wheel circuit breaker 56, and then to the individual cell tiers.

Mercury feed proportionator 12 acts solely as a proportioning feeder and is not intended to break the current in the mercury feed. It consists of a cylindrical vessel 40 and as many compartments 43a, 43b, etc., as there are cell tiers 3. As the tube 41 rotates with uniform speed over the compartments 43a, 43b, etc., and as these compartments are of uniform size, an equal amount of mercury will be fed to each compartment. If the amount of mercury to be fed to each cell tier needs to be increased or decreased, the speed of pump 10 may be increased or decreased or a valve in the by-pass line 12b may be opened or closed to control the mercury flow.

The mercury from each compartment 43a, 43b, etc., of the proportionator 12 flows through conduits 13a, 13b, etc., to star wheel circuit breaker 56. Each stream is fed through a tube 153 to a separate star wheel 56.

Circuit breaker 56 is essentially similar to that illustrated in FIG. 6A having a separate outlet 59a, 59b, etc., for each star wheel 56 and a dividing wall 15b between the outlets. However, since the mercury is discharged from all compartments of proportionator 12 at the same elevation, the inlet tubes 153 feeding the star wheels in circuit breaker 56 can also be at the same elevation. Thus, spiral flights 54 of the amalgam circuit breaker 15 can be eliminated and replaced by tubes 153.

It will be understood that the invention has been described for use with two bi-polar cell units solely for purposes of illustration and that it is not limited thereto but contemplates the use of a plurality of such cell units.

As described above, the mercury feed proportionator is provided with the number of discharge compartments corresponding to the number of cell units, and the mercury feed and amalgam discharge circuit breakers are provided with a corresponding number of star wheels.

Although the invention has been described for use in conjunction with bi-polar horizontal or inclined plane mercury electrolytic cells, it will be readily apparent that the circuit breakers described are useful for any fluent electrical conductor in use in cells under or producing electric current where it is desired to separate such cells electrically from each other and/or from the fluent electrical conductor. Thus, as a method and apparatus for feeding and discharging cells operating at different potential from a common feed source and into a common discharge, the method and apparatus herein described may be used for electrolysis cells of various types, for fuel cells and for various other purposes.

A simplified cross-section of a vertical fuel cell 80 is illustrated in FIG. 8. In this type of cell, a sodium-mercury amalgam is formed in zone 81 and passed to cell 80 through line 82. Amalgam flows down vertical steel electrode 83 serving as the cathode support. Water enters the cell at 84 at the base of the cell and the cell electrolyte passes out the top of the cell at 85. Oxygen is fed to the cell on the opposite side of porous oxygen electrode 86. Oxygen enters at 87 and leaves at 88. The amalgam reacts with the water, reducing the sodium content of the amalgam and forming sodium hydroxide as the electrolyte which is withdrawn at 85. Electric potential of about 1.7 volts is developed at the electrodes and may be utilized. The depleted amalgam collects at the base of cell 80 and is withdrawn in conduit 89 to pump 90 and returned by conduit 91 to mixer 81 for addition of more sodium.

A plurality of fuel cells may be connected in a bipolar arrangement to obtain a higher voltage. When this is done, each cell produces the same voltage, but each operates at a different potential above ground. Thus, the feed divider or proportionator 12 and the circuit breakers 15 and 56 described are useful here in the same manner as described. In this case one mixing vessel is used. The amalgam is sent through the divider to a multitude of cells, recombined in a star wheel circuit breaker, then one pump is used to send the amalgam back to the mixing vessel, and recirculate. Without the proportionator and circuit breaker, a multitude of mixing tanks and amalgam pumps and lines would be required, i.e., one for each cell and uniform feed to each cell would still be a problem. It is, of course, desirable to have a multitude of amalgam fuel cells so that a high voltage can be developed, since a single cell only develops 0.5 to 1.7 volts.

The amalgam from the operation of the mercury cathode electrolytic cells described above may be used as the feed to fuel cells.

In FIG. 9 it is shown that the amalgam from four mercury cells 3 could be sent through a star wheel circuit breaker 15A. In this case, the electrical circuit is merely broken for each amalgam stream and the amalgam streams are not recombined. To accomplish this, star breaker 15 is modified as shown in FIG. 6A, by putting a partition 15b in the base which extends above the water level and thus separates the mercury from each star wheel. The mercury is withdrawn through separate conduits 59a and 59b to separate fuel cells. For purposes of simplicity, the detail drawings of the star breaker in FIGS. 5, 6, 6A, 10 and 11 show only two star wheels for two cells. However, it is obvious that this is extendable to the diagrammatic illustration of FIG. 9 where four electrolytic and four fuel cells are shown. The spent amalgam leaving the lower end of fuel cells 80 is then sent through a similar star breaker 15A, then to individual pumps 10 and then back to the electrolytic mercury cells. In this way, the fuel cell is completely isolated electrically from the mercury cells. This, of course, is necessary since the potential on each mercury cell would be 3.5 to 5.0 volts while the potential for the fuel cell might be 0.5 to 1.7 volts. In addition, the amalgam in each fuel cell is isolated from that in the other.

Also referring to FIG. 9 it is obvious that the lower star breaker could operate as in FIG. 11 to combine all of the streams of mercury, send them to one pump which could then send them to a mercury divider which could in turn feed the multiplicity of mercury cells. In this way only one pump would be necessary for several fuel cells.

The current developed by each fuel cell would be 70 to 90% of that put into the mercury cell, the remainder due to a loss of current efficiency.

It will be apparent that any variation of arrangements may be used as desired, by placing the mercury feed divider or proportionator 12 or mercury circuit breaker 15 or 15A where required. For example, one electrolytic cell 3 could feed into a number of fuel cells 80 by use of a star breaker 15 and a feed divider 12. A number of cells 3 can feed into a larger number of fuel cells in the same way.

It will be apparent that the materials of construction for the feeding and separating devices may be any suitable materials as known in the art.

Thus, it will be readily apparent to persons skilled in the art that various changes and modifications may be made in the invention without departing from the spirit of the disclosure or the scope of the appended claims.

What I claim is:

1. The improved method of passing multiple continuous streams of fluent electrical conductive material into, through and out of a plurality of tiered bi-polar electro-chemical cells operated at different potentials one from the other while maintaining electrical separation of individual streams of said fluent material going into and out of each of said tiers, which comprises dividing said feed stream of said fluent material into a number of individual electrically separated streams corresponding to the number of tiers of bi-polar cells, separating each of said individual streams by sequentially charging said streams into a first series of electrically separated compartments to form a plurality of electrically separated increments, moving said increments rotationally around a horizontal axis in a continuous rotational direction so that at least one increment separates the first-formed increment from the last-formed increment, sequentially separately discharging each of said increments from the compartment in which it was formed into a pool of fluent material which is electrically separated from the corresponding pool of said other individual streams, passing the fluent conductive material from said pool into and through one of said bi-polar cells, discharging amalgamated fluent conductive material from said bi-polar cell as an electrically separated continuous stream of amalgamated fluent material, sequentially charging said steram of amalgamated material into a second series of electrically separated compartments to form a plurality of electrically separated increments, moving said amalgam increments by continuous rotational movement about a horizontal axis so that at least one increment separates the first-formed increment from the last-formed increment, and sequentially separately discharging each of said increments of amalgamated material from the compartment in which it was formed.

2. The method of claim 1 in which the fluent electrically conductive material is mercury and the amalgamated fluent material is a sodium mercury amalgam.

3. The method of claim 1 in which the electrically separated increments are V-shaped in cross-section with the base of the V adjacent the axis of rotation.

4. A device for discharging a plurality of amalgam streams from a plurality of tiers of a bi-polar multiple-tier mercury electrolytic cell while maintaining electrical separation of each of said tiers from the other tiers, which comprises a horizontal shaft having a plurality of star wheels mounted thereon, one for each of said plurality of streams, each said star wheel being electrically separate from the other star wheels on said shaft, each said star wheel having a plurality of electrically separate compartments, each said compartment having a V-shaped cross-section with the base of the V adjacent said horizontal shaft, means to continuously feed each of said plurality of amalgam streams to one of said star wheels at a point above said star wheel and into a compartment thereof, and means to rotate said shaft continuously in one direction to sequentially form individual electrically separate amalgam increments in said compartments and sequentially discharge each amalgam increment from its compartment below said star wheels, the number of compartments in said star wheels being such that there is one filled compartment between the receiving compartment and the discharging compartment.

5. A device for discharging a plurality of amalgam streams from a plurality of tiers of a bi-polar multiple-tier mercury electrolytic cell while maintaining electrical separation of each of said tiers from the other tiers, which comprises a horizontal shaft having a plurality of star wheels mounted thereon, one for each of said plurality of streams, each said star wheel being electrically separate from the other star wheels on said shaft, each said star wheel having at least eight electrically separate compartments, means to continuously feed each of said plurality of amalgam streams to one of said star wheels at a point substantially vertically above said shaft and into a compartment thereof, means to rotate said shaft continuously in one direction to sequentially form individual electrically separate amalgam increments in said compartments and sequentially discharge each amalgam increment below said star wheels.

6. The device of claim 5 in which the electrically separated compartments are V-shaped in cross-section with the base V adjacent said horizontal shaft.

7. An apparatus for feeding multiple continuous streams of fluent electrical conductive material into, through and out of a plurality of tiered bi-polar electrochemical cells operated at different potentials one from the other while maintaining electrical separation of individual streams of said fluent material going into and out of each of said tiers, which comprises means for dividing said feed stream of said fluent material into a number of individual electrically separated streams corresponding to the number of tiers of bi-polar cells, means for electrically separating each of said individual streams comprising a first series of electrically separated compartments to form a plurality of electrically separated increments of said fluent electrical conductive material, means to move said increments rotationally around a horizontal axis in a continuous rotational direction so that at least one increment separates the first-formed increment from the last-formed increment, means for sequentially separately discharging each of said increments from the compartment in which it was formed into a pool of fluent material which is electrically separated from the corresponding pool of said other individual streams, means to pass the fluent conductive material from said pool into and through one tier of said bi-polar cells, means to discharge the amalgamated fluent conductive material from each of said bi-polar cell tiers into a second series of electrically separated compartments to form a plurality of electrically separated increments, means to move said latter amalgam increments by continuous rotational movement about a horizontal axis so that at least one increment separates the first-formed increment from the last-formed increment, and means to sequentially separately discharge each of said latter formed increments of amalgamated material from the compartment in which it was formed.

8. The apparatus of claim 7 in which the electrically separated compartments consist of compartments in a star wheel.

9. The apparatus of claim 8 in which the electrically separated compartments are V-shaped in cross-section.

10. The method of operating a multiple tier diaphragmless bi-polar inclined flowing mercury cathode electrolysis cell having an inclination of about 2° to 85° from the horizontal, which comprises feeding substantially saturated brine to each tier of the cell and removing depleted brine and the electrolysis gas from each tier of the cell, providing a common main mercury feed stream for all tiers of the cell, dividing said main mercury feed stream into separated substantially equal amounts corresponding to the number of tiers of said cell and feeding one said equal amount into each tier of said cell by dividing the feed stream to each tier of said cell into a series of electrically separated increments, feeding said series of electrically separated increments continuously into a feed box at the head of each cell tier, feeding mercury from the feed boxes into the cell tiers below the top level of the mercury in each tier and below the brine in each tier, flowing the mercury from said feed boxes along the cathode plate of each tier to the other end of each tier of said cell while imposing the electrolyzing current on the brine and mercury in each tier, passing the electrolyzing current directly through the electrolyte to the mercury on each cathode plate without the intervention of a diaphragm, removing mercury amalgam from the end of each tier opposite said feed boxes and separating the amalgam into a series of electrically separated increments, discharging the increments into a common pool, flowing the amalgam from said common pool into an amalgam decomposer and recycling the mercury recovered from the amalgam decomposer to said main mercury feed stream.

References Cited
UNITED STATES PATENTS

| | | | |
|---|---|---|---|
| 588,276 | 8/1897 | Kellner | 204—220 |
| 699,414 | 5/1902 | Reed | 204—220 |
| 938,191 | 10/1909 | Whiting | 204—220 |
| 2,576,553 | 11/1951 | Andreasen | 204—219 |
| 2,688,594 | 9/1954 | Oosterman | 204—219 |
| 2,719,117 | 9/1955 | Blue et al. | 204—220 |
| 2,849,524 | 8/1958 | Matsuo et al. | 204—220 |
| 2,876,192 | 3/1959 | Wurbs | 204—220 |

HOWARD S. WILLIAMS, *Primary Examiner.*

T. TUNG, *Assistant Examiner.*